US006013152A

United States Patent [19]

Hasegawa et al.

[11] Patent Number: 6,013,152

[45] Date of Patent: Jan. 11, 2000

[54] UNSEASONED VENEER BONDING METHOD AND APPARATUS THEREFOR

[75] Inventors: Katsuji Hasegawa; Norio Shibagaki; Tokuro Nakabayashi, all of Obu, Japan

[73] Assignee: Meinan Machinery Works, Inc., Obu, Japan

[21] Appl. No.: 08/934,068

[22] Filed: Sep. 19, 1997

[30] Foreign Application Priority Data

Sep. 23, 1996 [JP] Japan .................................... 8-274128

[51] Int. Cl.[7] ........................................................ B32B 31/00

[52] U.S. Cl. .................... 156/258; 156/304.5; 156/304.6; 156/517; 156/583.1

[58] Field of Search ................................ 156/258, 304.5, 156/304.6, 580, 581, 583.1, 516, 517

[56] References Cited

U.S. PATENT DOCUMENTS

| | | | |
|---|---|---|---|
| 3,985,169 | 10/1976 | Chow | 144/317 |
| 4,841,907 | 6/1989 | Otsuka | 118/669 |
| 4,930,556 | 6/1990 | Prihoda | 144/347 |
| 4,931,113 | 6/1990 | Feichtmeir et al. | 156/64 |
| 5,372,168 | 12/1994 | Minami | 144/347 |

FOREIGN PATENT DOCUMENTS 56-095607 8/1981 Japan .

OTHER PUBLICATIONS

Patent Abstract of Japan Appln. No. 06134703, vol. 018, No. 435, Aug. 15, 1994.

Patent Abstract of Japan Appln. No. 08252805, vol. 097, No. 002, Feb. 28, 1997.

European Search Report.

Modified Abstract of EPO Appln. No. 97307223.4.

*Primary Examiner*—James Sells

*Attorney, Agent, or Firm*—Armstrong, Westerman, Hattori, McLeland and Naughton

[57] ABSTRACT

An unseasoned veneer bonding method and an apparatus therefor capable of bonding unseasoned veneers to each other without being affected by the moisture content of the unseasoned veneers and with ease. The unseasoned veneer bonding method comprising the steps of: machining an end portion of at least one unseasoned veneer of unseasoned veneers with prescribed thickness to be bonded to form a portion thinner than the prescribed thickness; overlapping the thinner portion of the one unseasoned and an end portion of the other unseasoned veneer to each other through thermosetting bonding agent; and press-contacting a heating body to at least the thinner portion.

13 Claims, 11 Drawing Sheets

UNSEASONED VENEER BONDING METHOD AND APPARATUS THEREFOR

BACKGROUND OF THE INVENTION

1. Field of the Invention

The present invention relates a method of bonding veneer sheets and an apparatus therefor to manufacture sheet material, such as plywood, LVL, and LVB, and more particularly to a veneer bonding method and an apparatus therefor with a veneer lathe, or the like, before the veneer sheets cut off from a log are dried, that is, under a condition that the veneer sheets are so-called unseasoned (hereinafter referred to as "unseasoned veneers").

2. Description of the Related Art

Conventionally, when unseasoned veneers are bonded to each other, for example, after powdery bonding agent is adhered to bonding faces of the unseasoned veneers, the bonding faces are adjusted to each other, and then the bonding faces are forcibly dried and bonded to each other through concentrated heating at bonded portions of the unseasoned veneers from their surfaces, or after the bonding faces of the unseasoned veneers are heated and dried in advance, and then bonding agent is applied to adjust the bonding faces to each other, the bonding faces are pressurized under heat so as to be bonded to each other, or thermosetting bonding agent is applied to the bonding faces of the unseasoned veneers and microwave is applied to the bonding surfaces while the bonding faces are contacted to each other to bond them to each other.

In the conventional unseasoned veneer bonding method described above, when powdery bonding agent is applied to the bonding faces of the unseasoned veneers and then the bonding faces are heated to bond the faces to each other, if moisture content of the unseasoned veneers to be bonded is low, the powdery bonding agent is not susceptible to be adhered to the bonding faces, so that it is required to select unseasoned veneers with more or equal to approximately 70% of moisture content.

Further, when the bonding face portions of the unseasoned veneers are heated and dried in advance before applying bonding agent to bond the unseasoned veneers to each other, a heating and drying apparatus for the heating and drying is separately necessary, so that overall apparatus becomes large for the heating and drying apparatus.

Further, when the unseasoned veneers are bonded to each other through microwave, heating velocity by the microwave is determined by output of the apparatus, kinds of tree from which the unseasoned veneer is manufactured, moisture content or direction of fibers of the unseasoned veneers, water content of the bonding agent, or amount of the bonding agent applied, and instant treatment with large output causes rapid increase of the temperature of the inside of the unseasoned veneers to excessively increase vaporization of the water, which may cause a fear of crack on the unseasoned veneers.

SUMMARY OF THE INVENTION

As described above, in the above-mentioned conventional apparatus, there are problems such that it is difficult to control heating temperature. Besides, the apparatus is complicated and large, and operation costs of the apparatus are relatively high.

Therefore, the object of the present invention is to provide an unseasoned veneer bonding method, and an apparatus therefor, capable of bonding unseasoned veneers to each other without being affected by the moisture content of the unseasoned veneers, and with ease.

In this invention, sufficient bonding strength of the unseasoned veneers is provide so as to be able to at least prevent the veneers from being separated from each other while the veneers are transported to the following process.

Therefore, the bonding strength of the bonding faces are, in case of veneer drying process in the following process for instance, obtained through hardening of the thermosetting bonding agent in the veneer drying process.

Further, the present invention has been made to provide an unseasoned veneer bonding method, and an apparatus therefor, capable of laterally and longitudinally bonding the unseasoned veneers.

It is therefore provided, in the present invention, to achieve the above-mentioned objects, the steps of machining an end portion of at least one unseasoned veneer of unseasoned veneers with prescribed thickness to be bonded to form a portion thinner than the prescribed thickness; overlapping the thinner portion of the one unseasoned veneer and an end portion of the other unseasoned veneer to each other through thermosetting bonding agent; and press-contacting a heating body to at least the thinner portion.

As a result, even if unseasoned veneers are bonded, when at least part of the thinner portion is press-contacted to the heating body, the thinner portion is easily dried and bonded, and a strength is provided sufficient to preventing the bonded end portions from being separated from each other until at least the bonded unseasoned veneers are transported to the following process. After that, for example in the following veneer drying device, the thermosetting bonding agent is completely hardened.

Another unseasoned veneer bonding method according to the present invention comprises: machining an end portion of at least one unseasoned veneer of unseasoned veneers with prescribed thickness to be bonded to form a first bonding end portion with a portion thinner than the prescribed thickness; machining an end portion of the other unseasoned veneer to form a second bonding end portion in a shape complementary to the first bonding end portion; engaging the thinner portion of the first bonding end portion and the second bonding end portion to each other through thermosetting bonding agent; and press-contacting a heating body to at least the thinner portion.

As a result, like the above-mentioned invention, the thinner portion of the bonding end portion is easily dried and bonded, so that the thinner portion is dried in a shorter period of time in comparison to a case in which unseasoned veneers with prescribed thickness are dried up to a moisture content suitable for bonding, which provides favorable bonding even if unseasoned veneers are bonded.

In the unseasoned veneer bonding method described above, before engaging the thinner portion of the first bonding end portion and the second bonding end portion to each other through thermosetting bonding agent, a heating body press-contacts or approaches at least the thinner portion of the first bonding end portion to evaporate at least part of moisture contained in the thinner portion.

In the above-mentioned methods, it is possible to form the first bonding end portion and the second bonding end portion to be scarf-shaped bonding end portions.

As a result, at least part of the moisture contained in the thinner portion is evaporated prior to the thermosetting bonding agent being applied to the bonding end portion, which causes the thinner portion of the bonding end portion to be more rapidly dried and bonded.

Still further, an unseasoned veneer bonding method according to the present invention comprises the steps of: machining an end portion of at least one unseasoned veneer of unseasoned veneers with prescribed thickness to be bonded to form a scarf-shaped first bonding end portion with a portion thinner than the prescribed thickness; machining an end portion of the other unseasoned veneer to form a scarf-shaped second bonding end portion in a shape complementary to the first bonding end portion; press-contacting a heating body to at least one scarf-shaped end portion of the first bonding end portion or the second bonding end portion to evaporate at least part of moisture contained in the end portion and plastically deforming a tip portion of the scarf-shaped end portion; engaging the first bonding end portion and the second bonding end portion to each other through thermosetting bonding agent; and press-contacting the heating body to at least the plastically deformed tip portion of the scarf-shaped end portion.

As a result, a scarf-shaped end portion with a portion thinner than the prescribed thickness is formed, and the tip portion of the scarf-shaped end portion is plastically deformed to be much thinner, which shortens the time for bonding and bonding strength is increased also.

In the aforementioned method, before engaging the thinner portion of the first bonding end portion and the second bonding end portion to each other through thermosetting bonding agent, hot air is blown to at least the thinner portion of the first bonding end portion to evaporate at least part of moisture contained in the thinner portion.

Still further, before engaging the thinner portion of the first bonding end portion and the second bonding end portion to each other, and the thinner portion of the second bonding end portion and the first bonding end portion to each other through thermosetting bonding agent, it is possible to blow a hot air to at least the thinner portions of the first and second bonding end portions to evaporate at least part of the moisture contained in the thinner portions.

In the above-mentioned methods, the first bonding end portion and the second bonding end portion may be formed to be scarf-shaped bonding end portions.

As a result, since the shape of the bonding end portions is complicated, even if the shape of the unseasoned veneer to be bonded is such that the heating body cannot press-contact nor approach at least the thinner portion of the bonding end portion, before thermosetting bonding agent is applied to the bonding end portion, at least part of the thinner portion of the bonding end portion is evaporated to more rapidly dry and bond the thinner portion of the bonding end portion.

In those methods described above, the at least thinner portion is press-contacted to a heating body with a press-contacting face having a channel which communicates an outside.

With these methods, steam, and the like, which is generated at the press-contact to the heating body, is discharged in the air through a channel, which prevents the unseasoned veneers from being cracked due to excessively accumulated generated steam.

Further, an unseasoned veneer bonding apparatus according to the present invention comprises: a machining device for machining end portions of unseasoned veneers to be bonded to each other to scarf-shaped bonding end portions; an applying apparatus for applying thermosetting bonding agent to at least one of the machined bonding end portions; and a heating and press-contacting device for press-contacting a heating body to at least a tip portion of the scarf-shaped end portion after the one bonding end portion is engaged with the other bonding end portion.

With this construction, the thinner portion of the bonding end portion is easily dried and bonded, so that the thinner portion is dried in a shorter period of time in comparison to a case in which unseasoned veneers with prescribed thickness are dried up to a moisture content suitable for bonding, which provides favorable bonding even if unseasoned veneers are bonded.

It is possible to mount a bonding end portion drying device to the unseasoned veneer bonding apparatus to press-contact a heating body to at least one of the machined bonding end portions to evaporate at least part of moisture contained in the bonding end portion.

With this construction, before thermosetting bonding agent is applied to the bonding end portion, at least part of moisture contained in the thinner portion of one of the bonding end portions is evaporated, which further shortens the time for drying and bonding the thinner portion of the bond end portion, and boding strength is increased also.

BRIEF DESCRIPTION OF THE DRAWINGS

The present invention will be more apparent from the following description with reference to the accompanying drawings wherein.

DETAILED DESCRIPTION OF THE PROFFERED EMBODIMENT

Embodiments of the present invention will be explained with reference to drawings.

Figure 1A:
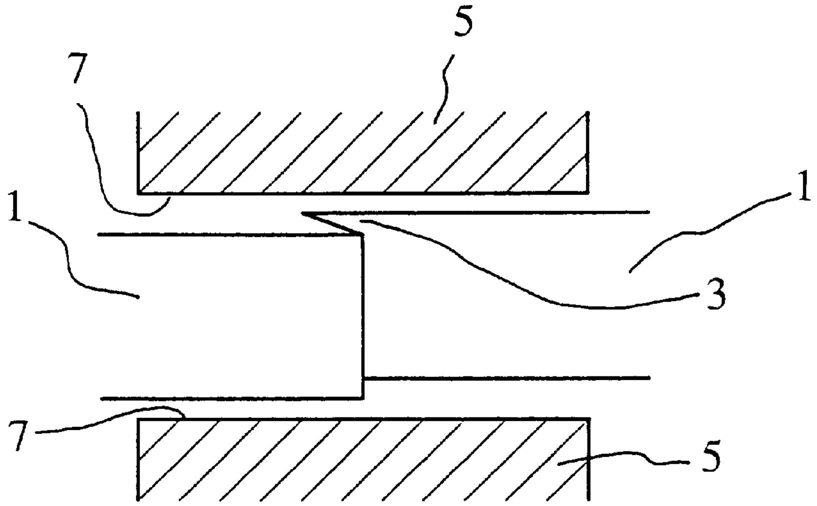
FIG. 1a through 1c are side views showing conditions in that unseasoned veneers are overlapped.

Firstly, the first embodiment according to the present invention will be explained with reference to FIGS. 1a through 1c. In the drawings, FIG. 1a is a side view showing a condition that one of unseasoned veneers 1 with prescribed thickness to be bonded is machined at an end portion thereof by a chamfering cutter (not shown) to form a partially thinner portion of the unseasoned veneer (hereinafter referred to as “thinner portion 3”) in comparison to the prescribed thickness of the unseasoned veneers, and then the thinner portion 3 is overlapped to an end portion of the other unseasoned veneer with thermosetting bonding agent between them.

Figure 1B:
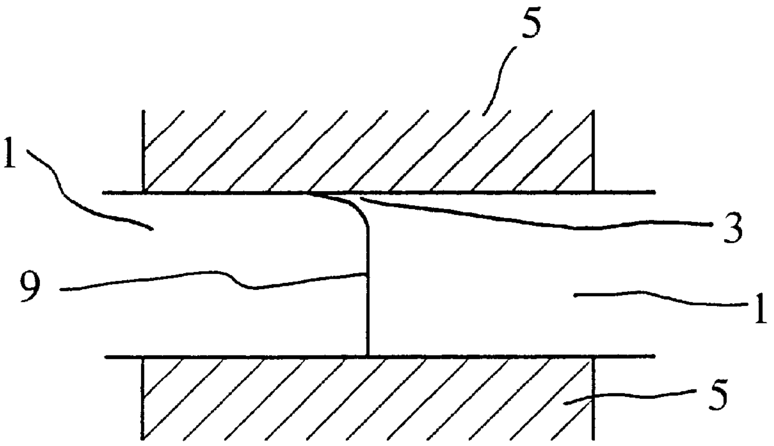

Further, in the drawings, FIG. 1*b* is a side view showing a condition that the end portions of the unseasoned veneers including the thinner portion 3 are press-contacted through a heating body 5 in a direction of the thickness of the veneers.

To the heating body 5 is connected a steam pipe (not shown) and steam supplied by way of the pipe causes the temperature of the heating body 5 to be set between 160° C. and 170° C.

When the heating body 5 press-contacts each of the end portions of the unseasoned veneers 1 and heat the end portions, the thinner portion 3 is easily dried for a shorter period of time in comparison to the other portions. Therefore, the dried thinner portion 3 is, so to speak, the same as a dried veneer, so that like a conventional method of bonding dried veneers, the thermosetting bonding agent is hardened through press-contact to the heating body 5, which allows the thinner portion 3 to be bonded.

By the way, bonding strength of the unseasoned veneers is sufficient if it prevents bonded end portions from being separated from each other while the bonded unseasoned veneers are transported to the following process. Therefore, it is unnecessary to press-contact an overall surface of a bonding face 9 to the heating body 5 until the thermosetting bonding agent is hardened, and it is sufficient to obtain a desired bonding strength by the bonding of the thinner portion 3 or the bonding of part of the thinner portion 3. This permits the bonding of the unseasoned veneers to be completed in a short period of time.

Time for the press-contact varies with temperature of the heating body 5, press-contacting force of the heating body 5, moisture content of the unseasoned veneers, shape of the thinner portion 3, and desired bonding strength of the bonding faces, but generally, the time required for the press-contact is between 15 seconds to 20 seconds.

Figure 1C:
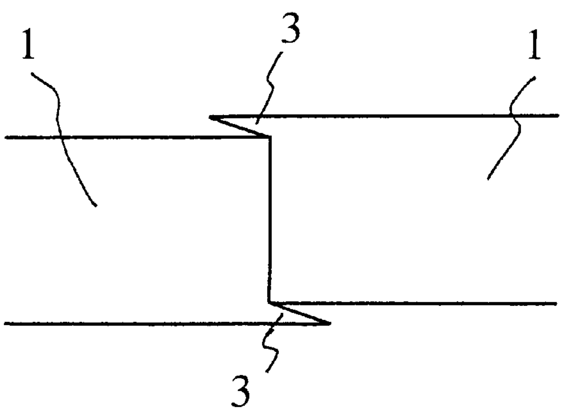
Figure 2A:
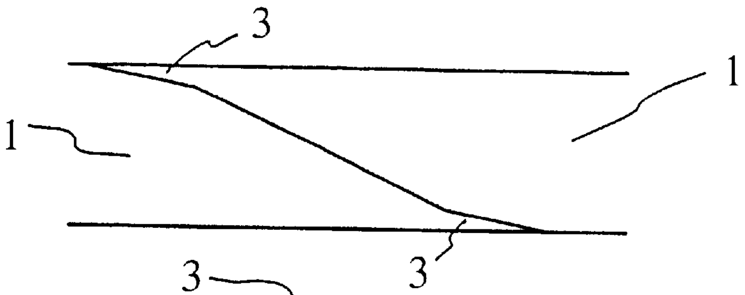
FIGS. 2a through 2g are side views showing conditions that the first bonding end portion and the second bonding end portion are engaged to each other.
Figure 2B:
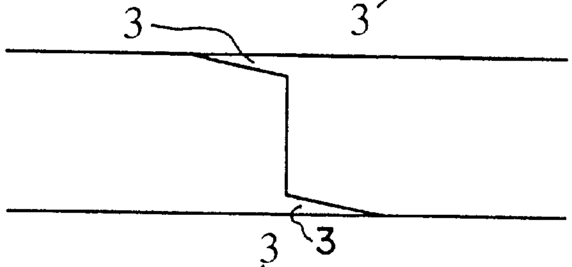
Figure 2C:
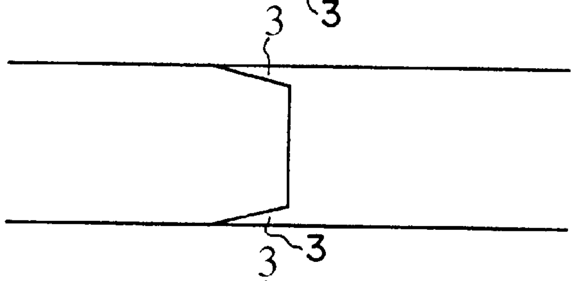
Figure 2D:
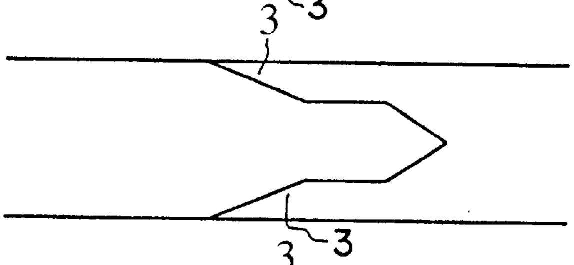
Figure 2E:
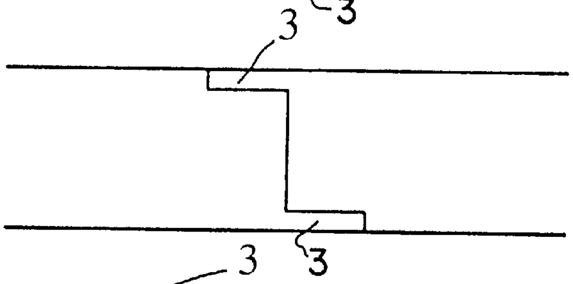
Figure 2F:
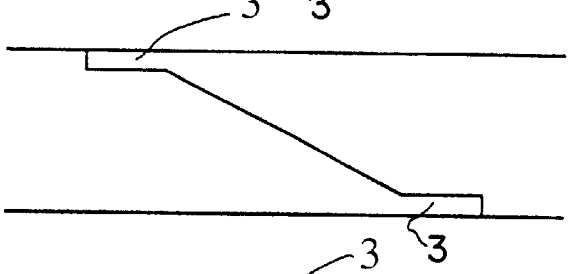
Figure 2G:
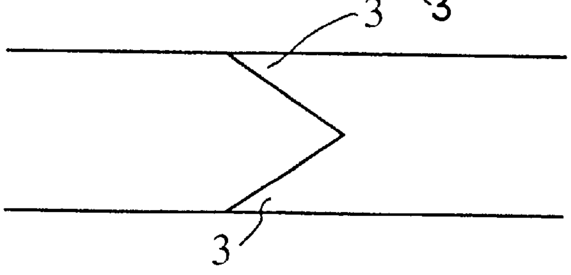

In the drawings, FIG. 1*c* is a side view for explaining the second embodiment of the present invention. This is a side view showing a condition that each of unseasoned veneers 1 with a prescribed thickness to be bonded is machined at end portions thereof by a chamfering cutter (not shown) to form thinner portions 3 of the unseasoned veneer in comparison to the prescribed thickness of the unseasoned veneers, and then the thinner portion 3 of one unseasoned veneer 1 is overlapped to an end portion of the other unseasoned veneer 1 with thermosetting bonding agent between them.

In this case, since there are thinner portions 3 on both sides of the bonding face 9, in comparison to a case shown in FIG. 1*a*, if the time required for the press-contact by the heating body 5 is constant, greater bonding strength is obtained, which is effective to bond thick unseasoned veneers to each other.

Further, in case that sufficient bonding strength is almost the same as that of the case shown in FIG. 1*a*, the time for the press-contact to the heating body 5 is to be shortened, resulting in improved productivity.

In this embodiment of the present invention, end portions including thinner portions 3, which are to be bonded, are press-contacted to the heating body 5 with certain margins, but, it is possible to locally press-contact only the thinner portions 3 as a matter of course.

Next, the third embodiment according to the present invention will be explained with reference to FIGS. 2*a* through 2*g*.

In the drawings, FIG. 2*a* through 2*g* are side views showing conditions that one unseasoned veneer 1 of the unseasoned veneers 1 with prescribed thickness to be bonded are machined by a chamfering cutter, a router, a plurality round saws which are combined into one set (none of them are shown) to form the first bonding end portion with the thinner portion 3, and an end portion of the other unseasoned veneer 1 is machined in a shape complementary to the first bonding end portion to form the second bonding end portion, and then the thinner portion 3 of the first bonding end portion and the second bonding end portion are engaged to each other through a thermosetting bonding agent.

“Machined in a shape complementary to the first bonding end portion to form the second bonding end portion” described above means that, when an end portion of the unseasoned veneer 1 is machined to form the first bonding end portion with the thinner portion 3, it is formed such that the portion removed from the unseasoned veneer 1 is compensated by the shape of the second bonding end portion. For example, as illustrated in the figures, each of the bonding faces may be engaged to each other.

Further, the shape of the first bonding end portion with the thinner portion 3 and the shape of the second bonding end portion are not restricted to those illustrated in the figures. In short, any shape may be adopted as long as the thinner portion 3 is formed.

Then, after each of the bonding end portions which are bonded to each other through thermosetting bonding agent is press-contacted through the heating body 5 (not shown), the thinner portions 3 are easily dried in a short period of time, so that in the dried portions, like the conventional bonding of dried veneers, the thermosetting bonding agent is hardened through the press-contact to the heating body 5, which allows the dried portions to be bonded.

Next, the fourth embodiment according to the present invention will be explained with reference to FIG. 3.

Figure 3:
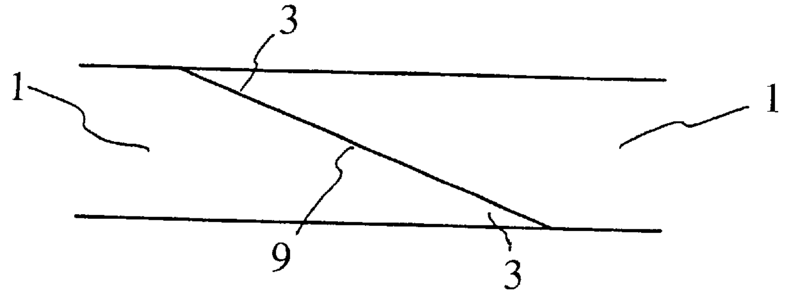
FIG. 3 is a side view showing a condition that scarf-shaped end portions are engaged to each other.

In this embodiment, each end portion of the unseasoned veneers 1 with prescribed thickness to be bonded is machined by a round saw (not shown) so as to be formed to be scarf-shaped first bonding end portion and second bonding end portion, and FIG. 3 is a side view showing a condition that the scarf-shaped bonding end portions are engaged to each other through the thermosetting bonding agent.

The above-mentioned bonding method with scarf-shaped bonding end portions has been performed generally, and with this method, the bonding end portions are easily machined, which is especially effective to machine thin unseasoned veneers.

As for the shape of the scarf, besides so-called plain scarf with plain bonding face 9 illustrated in the figure, tiered scarf (not shown) for preventing shift of the bonding faces may be adopted.

Then, the scarf-shaped bonding faces, which are bonded through thermosetting bonding agent, are press-contacted to each other through the heating body 5, especially the thinner portions 3 at tip portions of the scarf-shaped bonding faces are easily dried in a short period of time, like the conventional bonding of dried veneers, the thermosetting bonding agent is hardened through the press-contact of the heating body 5, which causes the portions to be bonded.

Further (this is not shown also), when the bonding end portions are engaged to each other through the thermosetting bonding agent, it is possible to engage the bonding end portions to each other with each scarf-shaped end portion being shifted so as to slightly project. With this method, the projecting end portions are concentratedly press-contacted to the heating body 5 due to their increased thickness, which facilitates drying to easily bond the end portions to each other, and the bonding strength tends to be increased also.

Next, the fifth embodiment according to the present invention will be explained with reference to FIGS. 4 and 5.

In this embodiment, although not shown, but an end portion of one unseasoned veneer 1 of unseasoned veneers 1 with prescribed thickness to be bonded are machined to form the first bonding end portion with the thinner portion 3, and an end portion of the other unseasoned veneer 1 is machined to form the second bonding end portion in a shape complementary to the first bonding end portion, and then, a heating body 11 and another heating body 11' contact or approach at least the thinner portion of either the first bonding end portion or the second bonding end portion, or at least the thinner portion of either end portion of the first bonding end portion or that of the second bonding end portion to evaporate at least part of moisture contained in the thinner portion, and then the thinner portion 3 of the first bonding end portion and the second bonding end portion are engaged to each other through thermosetting bonding agent, and then at least the thinner portion is press-contacted through the heating body 5.

Figure 4A:
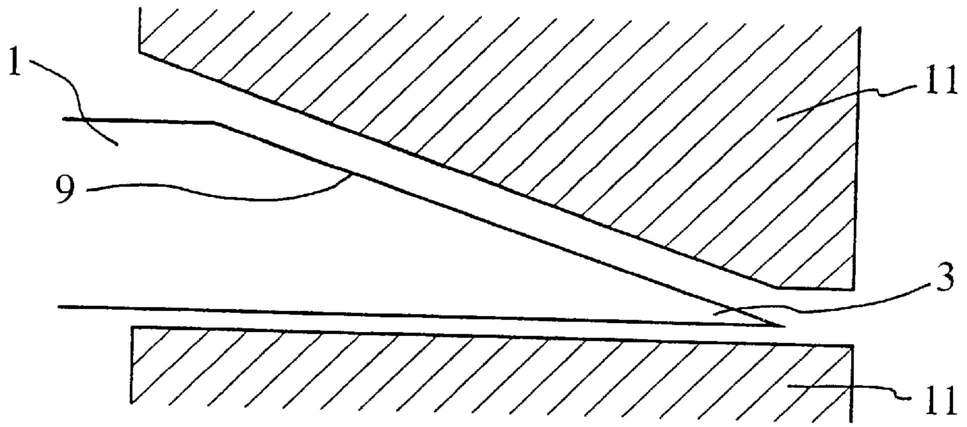
FIGS. 4a and 4b are side views for explaining conditions that a heating body is press-contacted to the scarf-shaped end portions to evaporate moisture contained therein.
Figure 4B:
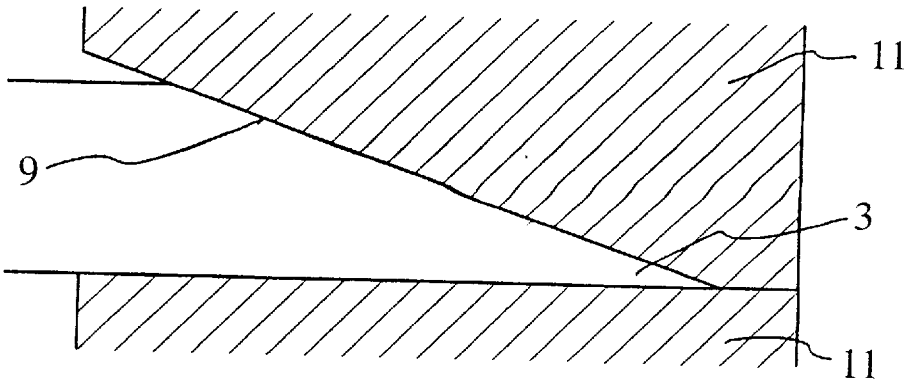

FIGS. 4*a* and 4*b* are side views for explaining a condition, in the above-mentioned embodiment, that the heating body 11 and the heating body 11' press-contact at least a thinner portion of one scarf-shaped bonding end portion to evaporated at least part of moisture contained in the thinner portion 3.

As understood from FIG. 4*b*, the scarf-shaped bonding end portion is press-contacted to the upper and lower heating bodies 11 and 11' to cause the moisture contained in a portion near the bonding face 9 to be evaporated. Then, especially, moisture contained in the thinner portion 3 rapidly evaporates.

As described above, evaporating at least part of the moisture contained in the thinner portion 3 in advance may cause the time for following press-contact by the heating body 5 to be shortened, resulting in improved productivity.

Further, with this advance evaporation, the moisture contained in the unseasoned veneer 1 and remaining therein is rarely moved to the portion under evaporation, so that in at least the thinner portion, the thermosetting bonding agent is scarcely diluted by the remaining moisture, which provides bonded unseasoned veneers with stabler strength.

To the heating body 11 and the heating body 11' are attached steam pipes (not shown), and steam supplied through the pipes permits the temperature of the heating body 11 and the heating body 11' to be set between 160° C. and 170° C.

In this embodiment, overall bonding faces 9 including the thinner portions 3 are press-contacted to the heating body 11, but it is possible to locally press-contact only the thinner portion 3 to evaporate the moisture contained, as a matter of course.

Further, it is also possible to use a heating body with high output electric heater to provide the same effect by only bringing it close to the thinner portion 3 without the press-contacting to the thinner portion 3.

Figure 5A:
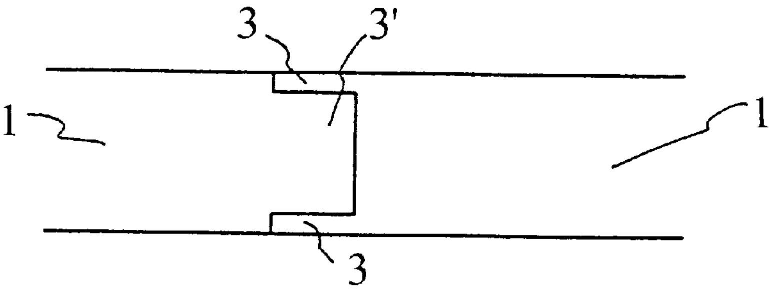
FIGS. 5a and 5b are side views for explaining a condition that moisture contained in the second bonding end portion is evaporated.
Figure 5B:
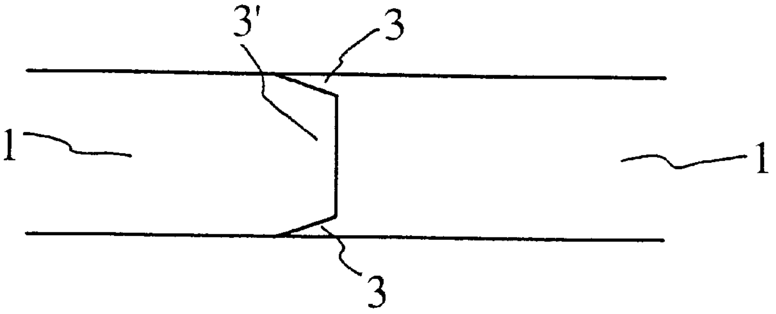

Next, FIGS. 5*a* and 5*b* are side views for explaining a condition, in the above-mentioned embodiments, that the heating body press-contacts or approaches at least the thinner portion of the second bonding end portion to evaporate at least part of the moisture contained in the thinner portion 3.

As understood from the figures, in this embodiment, it is especially effective when the shapes of the bonding end portions are designed such that the bonding end portions are engaged to each other.

In other words, in FIGS. 5*a* and 5*b*, the first bonding end portion is formed at an end of the right unseasoned veneer 1, and the second bonding end portion in a shape complementary to the first bonding end portion is formed at an end of the lefthand unseasoned veneer 1, and a thinner portion 3' is formed there.

Then, although not shown, a heating body press-contacts or approaches at least the thinner portion 3' of the second bonding end portion to evaporate at least part of moisture contained in the thinner portion 3'.

Therefore, as described above, the advance evaporation of at least part of the moisture contained in the thinner portion 3' simultaneously provides heat accumulating effect at at least the thinner portion 3', so that in the following process of press-contact by the heating body 5, thermosetting bonding agent and the thinner portion 3 of the first bonding end portion are heated from inside of bonded portions of unseasoned veneers also, causing time required for the bonding to be shortened, resulting in improved productivity.

Then, although not illustrated, in the aforementioned embodiment, explanation will be made about a process in which a heating body press-contacts or approaches at least the thinner portion to evaporate at least part of the moisture contained in the thinner portion.

This process equals to that which is obtained by combining the above-mentioned two embodiments, therefore, which further shortens the time for the bonding, resulting in improved productivity.

As for the time for the press-contact by the heating bodies 11 and 11', this varies with the temperature or press-contact force of the heating bodies 11 and 11', moisture content of the unseasoned veneers, shapes of the thinner portions 3 and 3', or desired amount of evaporation of the moisture contained, but, since excessive evaporating operation for the moisture contained causes poor productivity, it is preferable to adjust the time for the press-contact so as to be maintained only to an extent that this does not hinder the productivity. The time was approximately 10 seconds to produce a satisfactory result.

Further, when the first bonding end portion and the second bonding end portion are formed to be scarf-shaped end portions also, the same effect as the above will be obtained.

Next, with reference to FIGS. 6*a* and 6*b*, the sixth embodiment of the invention will be explained.

In this embodiment, end portions of unseasoned veneers to be bonded are formed to be a scarf-shaped first end portion and a scarf-shaped second end portion, and a heating body press-contacts or approaches at least one of the scarf-shaped end portions to evaporate at least part of moisture contained in the bonding end portion, and after the scarf-shaped end portion is plastically deformed, the first bonding end portion and the second bonding end portion are engaged to each other through thermosetting bonding agent, and then at least the scarf-shaped end portion subjected to the plastic deformation is press-contacted to the heating body 5.

Figure 6A:
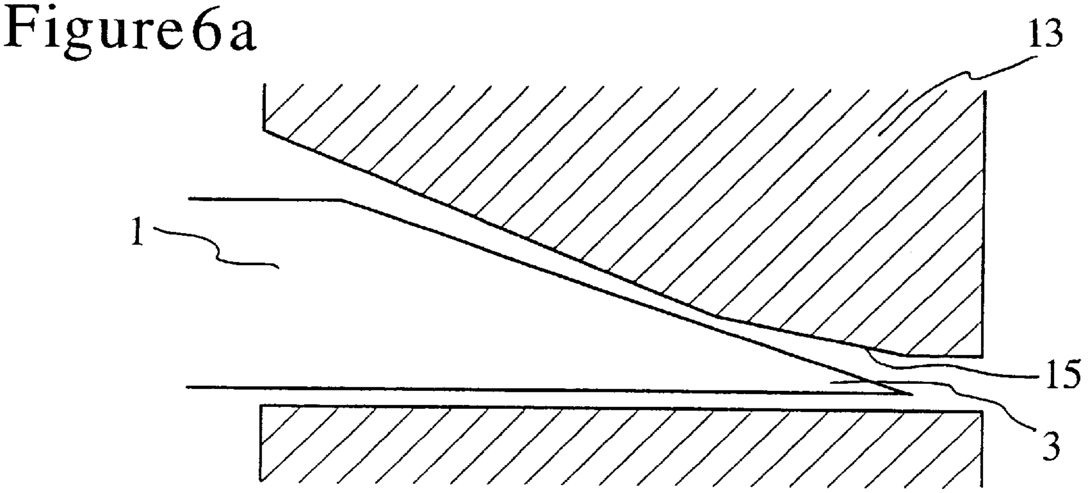
FIGS. 6a and 6b are side views for explaining a condition that a bonding end portion of a scarf-shaped end portion is plastically deformed.
Figure 6B:
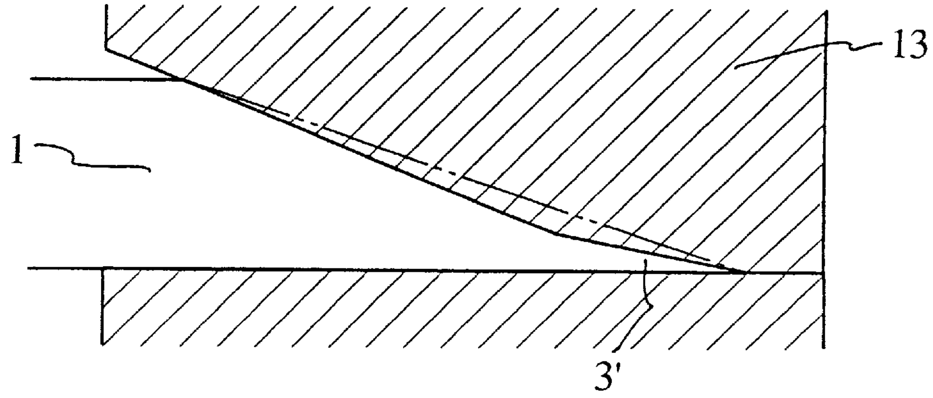

In the drawings, FIG. 6*a* is a side view showing a condition before the scarf-shaped bonding end portion is press-contacted to the heating body 13.

As clearly understood from the figures also, the heating body 13 is constructed such that the shape of the press-contacting face 15, which contacts the scarf-shaped bonding end portion, have a plurality of inclined planes with different angles, so that at the scarf-shaped bonding end portion, which is press-contacted by the heating body 13, is formed a portion 3' which is further sharper and thinner than before the press-contact.

The shape of the bonding end portion, press-contacted as described above, is formed under plastic deformation even after at least part of the moisture contained in the bonding end portion evaporates, and the press-contact by the heating body 13 is released.

After the bonding end portion which is plastically deformed to have a scarf shape with further thinner portion is engaged through thermosetting bonding agent, the bonding end portion is press-contacted to the heating body 5 at at least the scarf-shaped end portion under plastic deformation. Since the area of the thinner portion 3' is wider than the previous scarf-shaped end portion, the time required for evaporating moisture contained in the bonding end portion can be shortened further, and because the area from which the moisture evaporates becomes wider, bonded unseasoned veneers are provided with further stabler strength.

Further, though not shown, when the bonding end portions are engaged to each other through thermosetting bonding agent in such a manner that the thinner portion 3' subjected to plastic deformation slightly projects, as described above, the projecting end portions are concentratedly press-contacted to the heating body 13 due to their increased thickness, which facilitates drying to easily bond the end portions to each other, and the bonding strength tends to be increased also.

In this embodiment, overall scarf-shaped end portions are press-contacted to the heating body 13 but it is possible to locally press-contact only the end portions, as a matter of course.

The shape of the press-contacting face 15 of the heating body 13 is not restricted to the shape which is formed by a plurality of inclined planes with different angles, as illustrated in the figure. It is also possible to form the shape with a curved face, or combined planes and curved face.

In short, any shape is selectable as long as the scarf-shaped end portion is plastically deformed to form further thinner portion 3'.

As described above, the plastic deformation of the bonding end portion allows a bonding end portion with the considerably thinner portion 3', which is difficult to be formed by an ordinary machining method, to be formed.

Next, with reference to FIGS. 7*a* and 7*b*, the seventh embodiment of the invention will be explained.

In this embodiment, although not illustrated, one unseasoned veneer 1 of unseasoned veneers 1 with prescribed thickness to be bonded is machined to form the first bonding end portion with a thinner portion 3, and an end of the other unseasoned veneer is machined to form the second bonding end portion in a shape complementary to the first bonding end portion, and then hot air is blown to at least the thinner portion of either the first bonding end portion or the second bonding end portion, or at least the thinner portion of either end portion of the first bonding end portion or that of the second bonding end portion to evaporate at least part of moisture contained in the thinner portion, and then the thinner portion 3 of the first bonding end portion and the second bonding end portion are engaged to each other through thermosetting bonding agent, and then at least the thinner portion is press-contacted by the heating body 5.

Figure 7A:
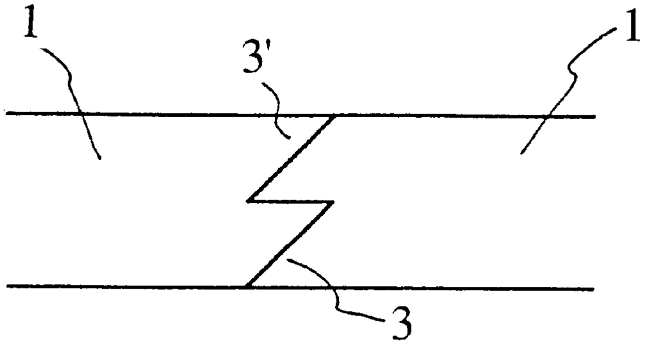
FIGS. 7a and 7b are side views for explaining a condition that moisture contained is evaporated through hot air.
Figure 7B:
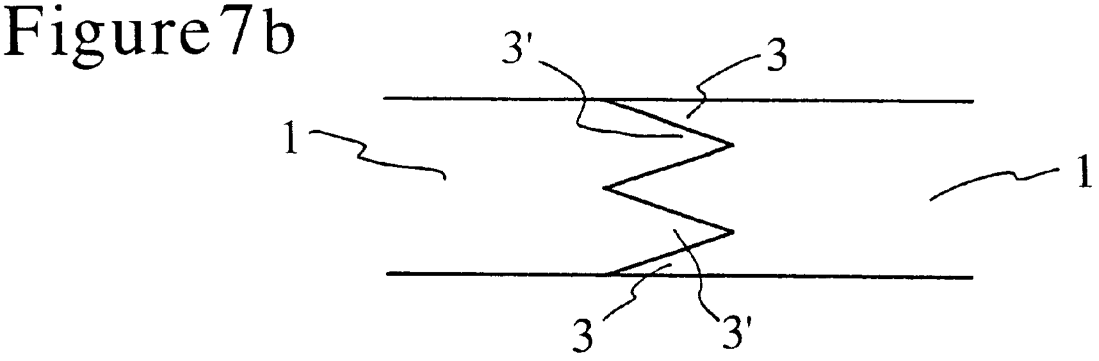

FIGS. 7*a* and 7*b* are side views for explaining the above embodiments.

As understood from FIGS. 7*a* and 7*b*, in this embodiment, it is especially effective when the shapes of the bonding end portions are formed to be complicated so as to be engaged to each other.

In other words, in the FIGS. 7*a* and 7*b*, at an end portion of the right unseasoned veneer 1 is formed the first bonding end portion with the thinner portion 3, and at an end portion of the left unseasoned veneer 1 is formed the second bonding end portion in a shape complementary to the first bonding end portion, and the thinner portion 3' is formed there.

Then, though not illustrated, a hot air blower using a high output electric heater as a heat source to change the air blown to the heat source into a hot air is used to blow said hot air to at least the thinner portions of the bonding end portions and to evaporate at least part of the moisture contained in the thinner portions.

As described above, the advance evaporation of part of moisture contained in the thinner portion 3, in the thinner portion 3', or in both of the them allows the time for the press-contact to the heating body 5 in the following process, resulting in improved productivity.

Effect of the evaporation of the contained moisture by hot air is the same as the case in which the moisture is evaporated by the press-contact or the approach of the heating body 13.

Still further, as described above, intangible hot air is used to evaporate at least part of moisture contained in at least the thinner portion so that even if the shape of the bonding end portion is complicated, for example, the evaporation can be carried out with ease.

Next, the eighth embodiment of the invention will be explained with reference to FIGS. 8*a* and 8*b*.

Figure 8A:
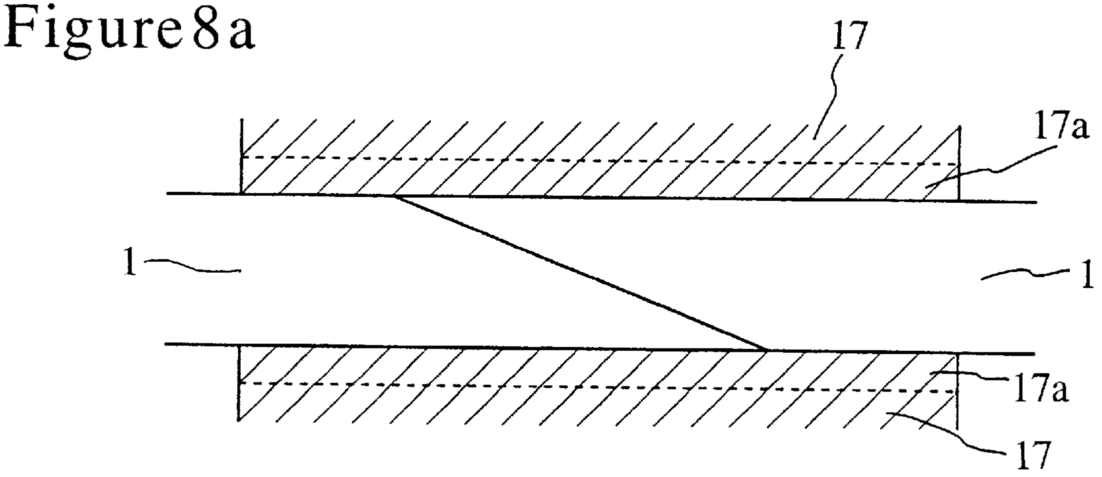
FIGS. 8a and 8b are a side view and a front view for explaining a condition that an unseasoned veneer is press-contacted to a heating body with channels.
Figure 8B:
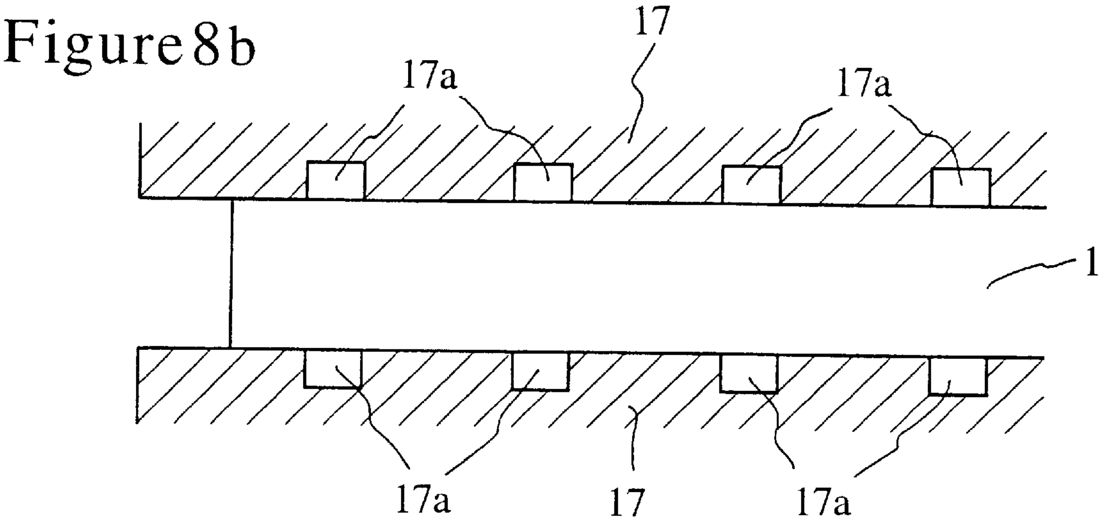

In the drawings, FIG. 8*a* is a side view for explaining the embodiment, and FIG. 8*b* is a front view of the same as shown in FIG. 8*a*.

These figures show the embodiment, and in the figures, scarf-shaped end portions which are formed at end portions of the unseasoned veneers 1 are engaged to each other through thermosetting bonding agent, and then those portions are press-contacted by heating bodies 17.

Channels 17*a* are formed in the heating body, and the channels 17*a* are used, during the press-contact of the heating body 17, for discharging steam, which is generated at a portion adjacent to contact portions of the channel 17*a* and the unseasoned veneers 1, to outside.

Next, effect of the steam generated will be explained. Although it is not important when the press-contact force of the heating body is relatively weak, when the press-contact force is strengthened since unseasoned veneers to be bonded are thick and stiff, or when the temperature of the heating body is high, temperature inside of the unseasoned veneers is quickly increased to excessively facilitate the evaporation of the moisture contained. Therefore, when the pressure of the heating body is raised to finish the press-contact, the excessively increased vapor is released outside at a stretch, which causes a problem of damaged unseasoned veneer or the like.

Therefore, in case that the press-contact is carried out through the heating body 17 with the channels 17*a*, steam generated during the press-contact is discharged outside through the channels 17*a* as occasion demands, so that such problem described above will not arise.

As for the shape of the channels 17*a*, in this embodiment, the channels 17*a* are formed so as to extend in the same direction as the unseasoned veneers are bonded, the direction is not restricted to this direction, and the channels may be machined so as to extend in a direction perpendicular to the direction in which the unseasoned veneers are bonded or inclined to the direction. In short, any channels are selectable as long as the channels are in communication with outside to discharge the steam generated outside the unseasoned veneers.

In this embodiment, the channels 17*a* are machined so as to be 3 mm in width, 2.5 mm in depth, and 12 mm in pitch therebetween.

Though not illustrated, it is possible to apply the channels 17*a* to the heat body for evaporating moisture contained in the bonding end portions in the fifth embodiment.

Next, the ninth embodiment of the present invention will be explained with reference to FIGS. 9 and 10.

The invention claimed in claim 14 is of an unseasoned veneer bonding apparatus to practice the unseasoned veneer bonding method claimed in claim 3. Therefore, the effect of this embodiment is the same as stated in the embodiment of the invention claimed in claim 3.

Figure 9:
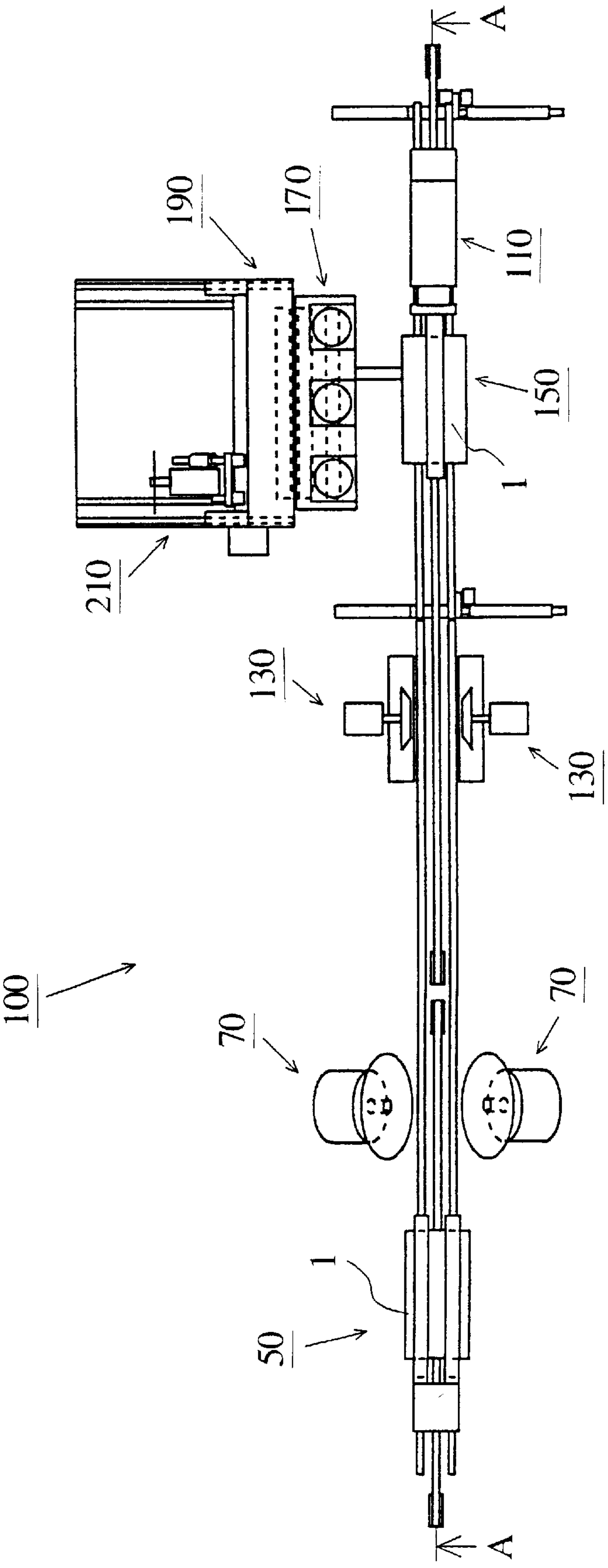
FIG. 9 is a schematic plan view of a veneer bonding apparatus according to the present invention.
Figure 10:
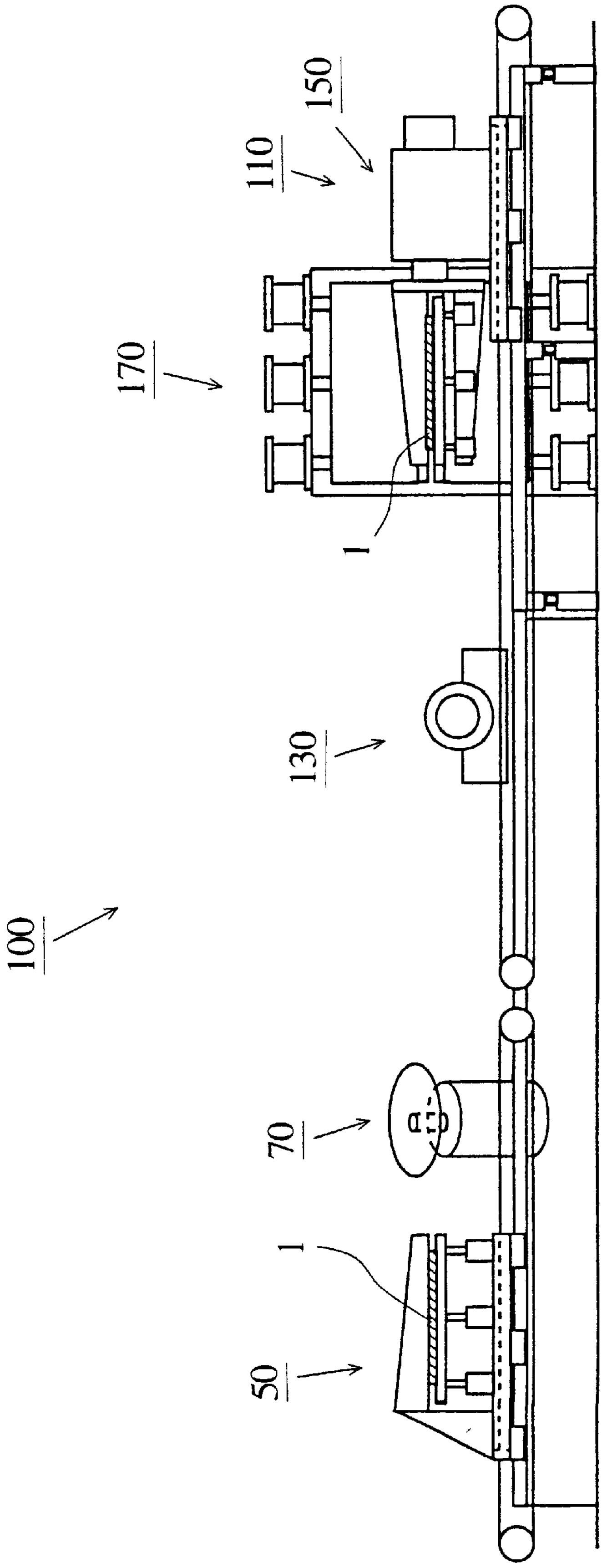
FIG. 10 is a schematic longitudinal cross-sectional view of the veneer bonding apparatus taken along the line A—A in FIG. 9.

At first, FIG. 9 is a schematic plan view of the veneer bonding apparatus for bonding unseasoned veneers to each other, and a cross section taken along the line A—A in this figure is shown in FIG. 10 as a schematic longitudinal cross-sectional view.

Reference numeral 100 is an unseasoned veneer bonding apparatus for bonding the unseasoned veneers 1 to each other.

The unseasoned veneer bonding apparatus 100 comprises:

a veneer feeding device 50 for transporting the unseasoned veneers 1 while nipping the unseasoned veneers 1 to an applying device described below in the following process;

a bonding face machining device 70 for machining both end portions of the unseasoned veneer 1 to bonding end portions, the both end portions parallel to a direction in which the unseasoned veneers 1 are transported while the veneer feeding device 50 nips the unseasoned veneer 1;

a bonding agent applying device 130 for applying thermosetting bonding agent to the bonding face of at least one bonding end portion while the veneer feeding device 50 nips the unseasoned veneer 1;

a veneer transporting device 110 with an engaging device described below, the veneer transporting device 110 nipping the unseasoned veneer 1 while the veneer feeding device 50 nips the unseasoned veneer 1 with at least one bonding end portion to which the thermosetting bonding agent is applied, and transporting the unseasoned veneer 1 to a heating and press-contacting device described below in the following process after the nipping of the unseasoned veneer 1 by the veneer feeding device 50 is released;

the engaging device 150 for engaging the bonding end portions of one unseasoned veneer and the other unseasoned veneer to each other;

the heating and press-contacting device 170 for press-contacting the engaged bonding end portions to each other through a heating body;

an engaged unseasoned veneer transporting device 190 for nipping the unseasoned veneers 1 (not shown) bonded by the pressurizing device 17, and for transporting the unseasoned veneers 1 to a bonding position of the press-contacting device 170 for the bonding of the rear bonding face of the unseasoned veneer 1 to the front bonding face of the succeeding veneer after the nipping of the unseasoned veneer 1 by the press-contacting device 170 is released; and a regular cutting device 210 for cutting the bonded veneer to a predetermined length.

With the aforementioned construction, after the both end portions of the unseasoned veneer 1, which are to be bonded by the bonding face machining device 70, are machined to form bonding end portions, thermosetting bonding agent is applied to at least one bonding face of the machined bonding end portions by the bonding agent applying device 130, and then, the front end bonding face of the following veneer is engaged to the rear bonding face of the preceding veneer by the press-contacting face 15 such that the one unseasoned veneer 1 to which the thermosetting bonding agent is applied and the other unseasoned veneer 1 to which the thermosetting bonding agent is applied are engaged to each other, and then the unseasoned veneers 1 are heated and press-contacted to bond them to each other.

The tenth embodiment of the invention will be explained with reference to FIGS. 11 and 12.

This embodiment relates an unseasoned veneer bonding apparatus to practice the method according to the fifth embodiment. Therefore, the effect of this embodiment is the same as stated in the fifth embodiment.

Figure 11:
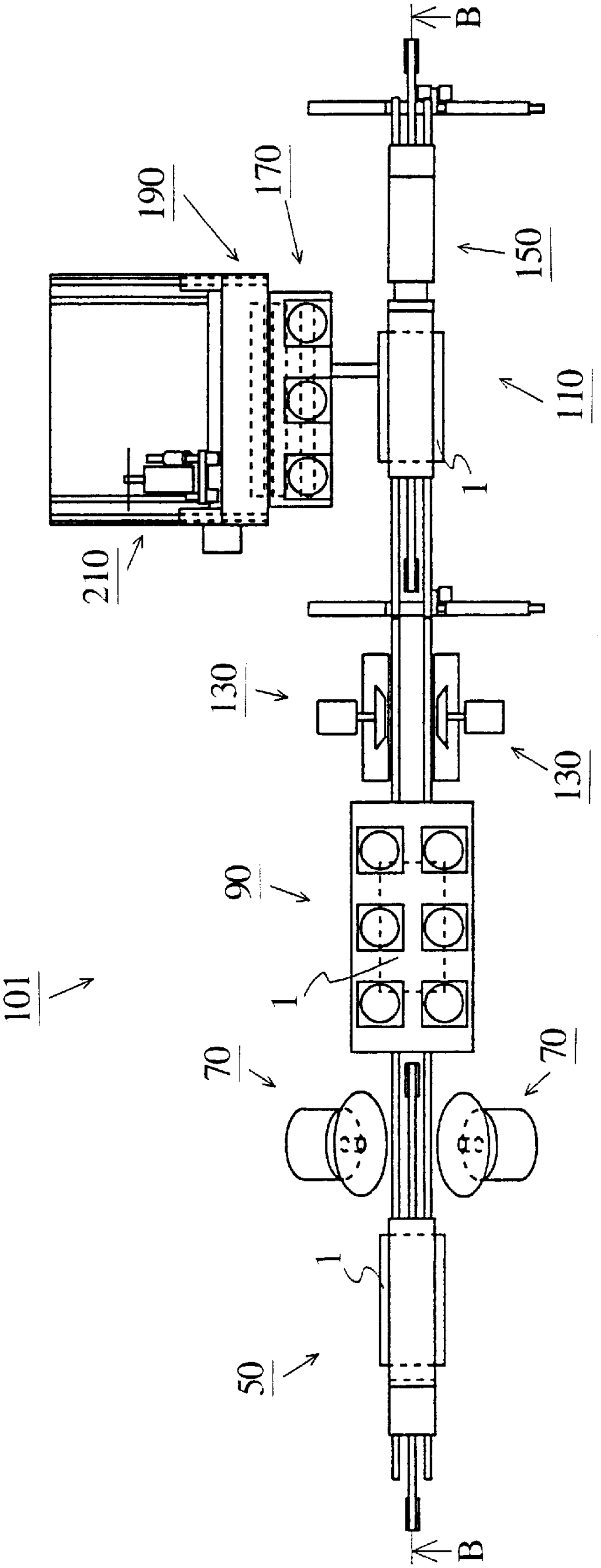
FIG. 11 is a schematic front view of another veneer bonding apparatus according to the present invention.
Figure 12:
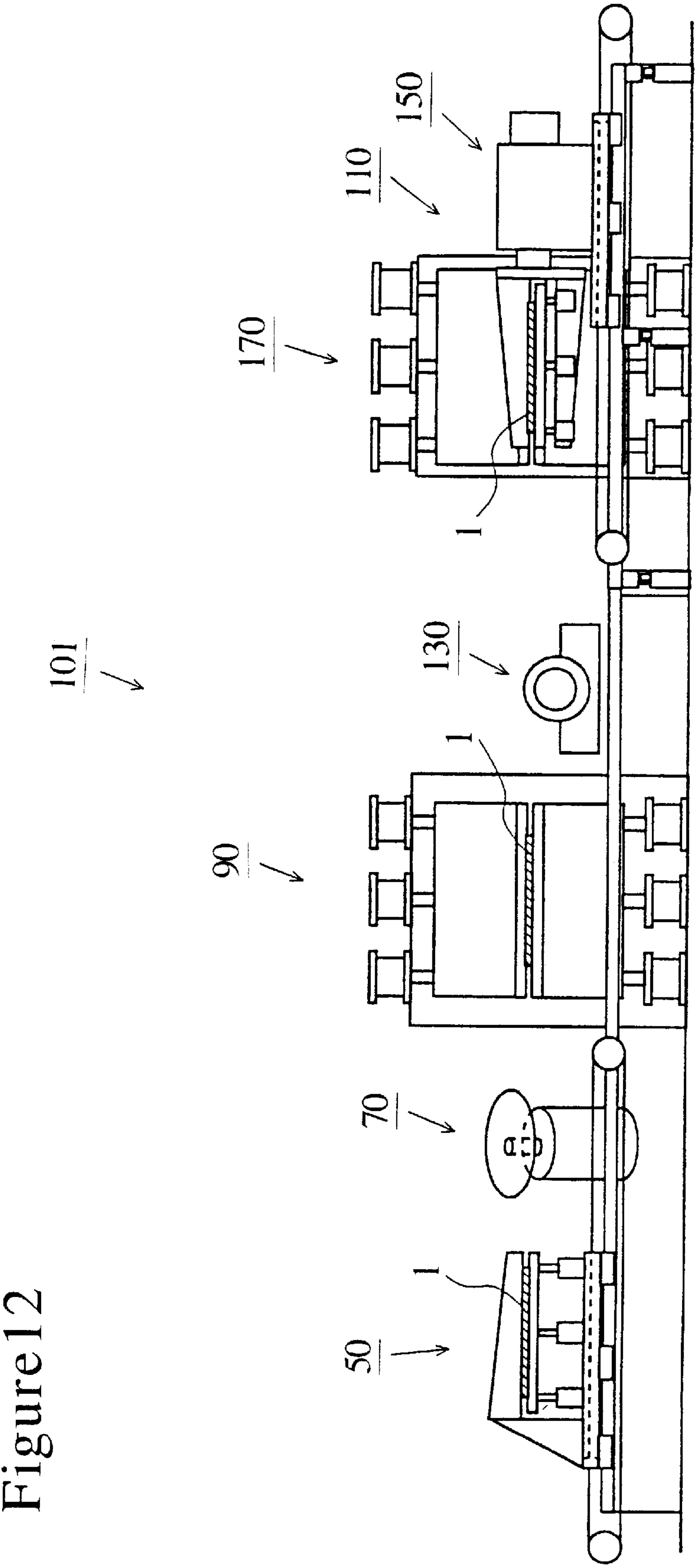
FIG. 12 is a schematic longitudinal cross-sectional view of the veneer bonding apparatus taken along the line B—B in FIG. 11.

At first, FIG. 11 is a schematic plan view of the veneer bonding apparatus for bonding unseasoned veneers to each other, and a cross section taken along the line B—B in this figure is shown in FIG. 12 as a schematic longitudinal cross-sectional view.

Reference numeral 101 is an unseasoned veneer bonding apparatus for bonding the unseasoned veneers 1 to each other.

The unseasoned veneer bonding apparatus 101 comprises:

a veneer feeding device 50 for transporting the unseasoned veneers 1 while nipping the unseasoned veneers 1 to a bonding end portion drying device described below in the following process;

a bonding end portion machining device 70 for machining both end portions of the unseasoned veneer 1 to bonding end portions while the veneer feeding device 50 nips the unseasoned veneer 1, the both end portions parallel to a direction in which the unseasoned veneers 1 are transported;

the bonding end portion drying device 90 for evaporating at least part of moisture contained in the bonding end portion by press-contacting a heat body to at least either one of machined bonding end portions while nipping the unseasoned veneer 1 while the veneer feeding device 50 nips the unseasoned veneer 1 with both ends which are machined to the bonding end portions;

a veneer transporting device 110 with an engaging device described below, the veneer transporting device 110 nipping the unseasoned veneer 1 while the bonding end portion drying device 90 nips the unseasoned veneer 1, and transporting the unseasoned veneer 1 to a heating and press-contacting device described below in the following process after the nipping of the unseasoned veneer 1 by the bonding end portion drying device 90 is released;

a bonding agent applying device 130 for applying thermosetting bonding agent to at least one of the bonding end portions of which moisture is partially evaporated, while the veneer transporting device 110 nips the unseasoned veneer 1;

the engaging device 150 for engaging the bonding end portions of one unseasoned veneer and the other unseasoned veneer to each other;

the heating and press-contacting device 170 for press-contacting the engaged bonding end portions to each other through a heating body;

an engaged unseasoned veneer transporting device 190 for nipping the unseasoned veneers 1 (not shown) bonded by the pressurizing device 170, and for transporting the unseasoned veneers 1 to a bonding position of the press-contacting device 170 for the bonding of the rear bonding end portion of the unseasoned veneer 1 to the front bonding face of the succeeding veneer after the nipping of the unseasoned veneer 1 by the press-contacting device 170 is released; and a regular cutting device 210 for cutting the bonded veneer to a predetermined length.

With the constructions of the present invention described above, the following effects are obtained.

Since at least part of the thinner portion which is formed to be a bonding end portion is easily dried and adhered, there is obtained a strength sufficient to prevent the bonding end portions from being separated from each other, even if unseasoned veneers are used.

Further, as described above, the thinner portion of the bonding end portion is easily dried and adhered, so that the thinner portion can be dried in a shorter period of time in comparison to a case that an unseasoned veneer with a prescribed thickness is dried up to a moisture content suitable for bonding of the veneers, which permits favorable bonding even if unseasoned veneers are handled.

Further, part of moisture contained in at least the thinner portion of the bonding end portion is evaporated before thermosetting bonding agent is applied to the bonding end portion, which causes the thinner portion of the bonding end portion to be dried much faster and to be bonded, resulting in improved productivity.

Still further, a bonding end portion which becomes a scarf shape with further thinner portion under plastic deformation allows time required for evaporation of moisture contained in the bonding end portion to be shortened, and allows area from which the moisture is evaporated to become wider, providing bonded unseasoned veneers with further stabler strength.

Further, plastic deformation of end portion of an the bonding end portion allows a bonding end portion with a considerably thinner portion, which is difficult to be formed by an ordinary machining method, to be formed.

Still further, intangible hot air is used to evaporate at least part of moisture contained in at least the thinner portion, so that, even if the shape of the bonding end portion is complicated, for example, the evaporation can be carried out with ease.

Further, press-contact is carried out through a heating body with channels, steam generated at the press-contact is discharged outside through the channels as occasion demands, so that problems such as damage of unseasoned veneer, which is caused when excessively increased vapor is released outside at a stretch, are eliminated.

Still further, at least part of the thinner portion of the bonding end portion is easily dried and adhered through press-contact of a heating body, which permits favorable bonding even if unseasoned veneers are handled.

Further, evaporating at least part of the moisture contained in a scarf-shaped end portion in advance may cause the time for following press-contact by a heating body to be shortened, resulting in improved productivity.

Further, with the advance evaporation described above, moisture remaining in the unseasoned veneer 1 is scarcely moved to the portions from which moisture is evaporated thermosetting agent is scarcely diluted by the remaining moisture at least at the thinner portion, which provides bonded unseasoned veneers with stabler strength.

What is claimed is:

1. An unseasoned veneer bonding method comprising the steps of:

machining an end portion of at least one unseasoned veneer of a plurality of unseasoned veneers with prescribed thickness to be bonded to form a portion thinner than said prescribed thickness;

applying a thermosetting bonding agent to said thinner portion of said end portion;

overlapping said thinner end portion of the one unseasoned veneer and an end portion of the other unseasoned veneer with respect to each other; and press-contacting a heating body to at least said thinner portion to evaporate moisture therefrom and to bond said overlapping end portions of said veneers together.

2. An unseasoned veneer bonding method comprising the steps of:

machining an end portion of at least one unseasoned veneer of a plurality of unseasoned veneers with prescribed thickness to be bonded to form a first bonding end portion with a portion thinner than said prescribed thickness;

machining an end portion of another unseasoned veneer to form a second bonding end portion in a shape complementary to said first bonding end portion;

applying a thermosetting bonding agent to said thinner portion of at least one of said bonding end portions;

engaging said thinner portion of the first bonding end portion and the second bonding end portion to each other through said thermosetting bonding agent; and press-contacting a heating body to at least said engaged thinner portion of said bonding end portion to evaporate moisture from said thinner portion and to bond said engaged end portions of said veneers together.

3. An unseasoned veneer bonding method comprising the steps of:

machining an end portion of at least one unseasoned veneer of unseasoned veneers with prescribed thickness to be bonded to form a first bonding end portion with a portion thinner than said prescribed thickness;

machining an end portion of the other unseasoned veneer to form a second bonding end portion in a shape complementary to said first bonding end portion;

engaging said thinner portion of the first bonding end portion and the second bonding end portion to each other through thermosetting bonding agent; and press-contacting a heating body to at least said thinner portion, wherein, before engaging said thinner portion of said first bonding end portion and said second bonding end portion to each other through thermosetting bonding agent, a heating body press-contacts or approaches at least said thinner portion of the first bonding end portion to evaporate at least part of moisture contained in the thinner portion.

4. The unseasoned veneer bonding method as claimed in claim 2, further comprising the steps of:

machining said end portion of said second bonding end portion to form a portion thinner than said prescribed thickness;

machining said first bonding end portion in a shape complementary to said second bonding end portion;

applying a thermosetting bonding agent to said thinner portion of at least one of said bonding end portions;

engaging said thinner portion of the first bonding end portion and the second bonding end portion to each other, and said thinner portion of the second bonding end portion and the first bonding end portion to each other through said thermosetting bonding agent; and press-contacting a heating body to at least said thinner portions of said bonding end portions to evaporate moisture from said thinner portions and to bond said engaged end portions of said veneers together.

5. An unseasoned veneer bonding method comprising the steps of:

machining an end portion of at least one unseasoned veneer of unseasoned veneers with prescribed thickness to be bonded to form a first bonding end portion with a portion thinner than said prescribed thickness;

machining an end portion of the other unseasoned veneer to form a second bonding end portion in a shape complementary to said first bonding end portion;

machining an end portion of said second bonding end portion to form a portion thinner than said prescribed thickness;

machining said first bonding end portion in a shape complementary to said second bonding end portion;

engaging said thinner portion of the first bonding end portion and the second bonding end portion to each other, and said thinner portion of the second bonding end portion and the first bonding end portion to each other through thermosetting bonding agent; and press-contacting a heating body to at least said thinner portions, wherein, before engaging said thinner portion of the first bonding end portion and the second bonding end portion to each other, and said thinner portion of the second bonding end portion and the first bonding end portion to each other through thermosetting bonding agent, a heating body press-contacts or approaches at least said thinner portion of the first bonding end portion and said thinner portion of the second bonding end portion to evaporate at least part of moisture contained in the thinner portions.

6. The unseasoned veneer bonding method as claimed in any one of claims 2 to 5, wherein said first bonding end portion and said second bonding end portion are formed to be scarf-shaped bonding end portions.

7. An unseasoned veneer bonding method comprising the steps of:

machining an end portion of at least one unseasoned veneer of unseasoned veneers with prescribed thickness to be bonded to form a scarf-shaped first bonding end portion with a portion thinner than said prescribed thickness;

machining an end portion of the other unseasoned veneer to form a scarf-shaped second bonding end portion in a shape complementary to said first bonding end portion;

press-contacting a heating body to at least one scarf-shaped end portion of the first bonding end portion or the second bonding end portion to evaporate at least part of moisture contained in said end portion and plastically deforming a tip portion of said scarf-shaped end portion;

engaging said first bonding end portion and said second bonding end portion to each other through thermosetting bonding agent; and press-contacting said heating body to at least said plastically deformed tip portion of the scarf-shaped end portion.

8. An unseasoned veneer bonding method comprising the steps of:

machining an end portion of at least one unseasoned veneer of unseasoned veneers with prescribed thickness to be bonded to form a first bonding end portion with a portion thinner than said prescribed thickness;

machining an end portion of the other unseasoned veneer to form a second bonding end portion in a shape complementary to said first bonding end portion;

engaging said thinner portion of the first bonding end portion and the second bonding end portion to each other through thermosetting bonding agent; and press-contacting a heating body to at least said thinner portion, wherein, before engaging said thinner portion of said first bonding end portion and said second bonding end portion to each other through thermosetting bonding agent, hot air is blown to at least said thinner portion of the first bonding end portion to evaporate at least part of moisture contained in the thinner portion.

9. An unseasoned veneer bonding method comprising the steps of:

machining an end portion of at least one unseasoned veneer of unseasoned veneers with prescribed thickness to be bonded to form a first bonding end portion with a portion thinner than said prescribed thickness;

machining an end portion of the other unseasoned veneer to form a second bonding end portion in a shape complementary to said first bonding end portion;

machining an end portion of said second bonding end portion to form a portion thinner than said prescribed thickness;

machining said first bonding end portion in a shape complementary to said second bonding end portion;

engaging said thinner portion of the first bonding end portion and the second bonding end portion to each other, and said thinner portion of the second bonding end portion and the first bonding end portion to each other through thermosetting bonding agent; and press-contacting a heating body to at least said thinner portions, wherein, before engaging said thinner portion of the first bonding end portion and the second bonding end portion to each other, and said thinner portion of the second bonding end portion and the first bonding end portion to each other through thermosetting bonding agent, hot air is blown to at least said thinner portions of the first and second bonding end portions to evaporate at least part of moisture contained in the thinner portions.

10. The unseasoned veneer bonding method as claimed in any one of claim 8 or claim 9, wherein said first bonding end portion and said second bonding end portion are formed to be scarf-shaped bonding end portions.

11. The unseasoned veneer bonding method as claimed in any one of claims 1–5, 7, 8 or 9, wherein said at least thinner portion is press-contacted by a heating body with a press-contacting face having a channel which communicates an outside.

12. An unseasoned veneer bonding apparatus comprising:

a machining device operative to machine end portions of unseasoned veneers to be bonded to each other to scarf-shaped bonding end portions including a tip portion thinner than a prescribed thickness of said unseasoned veneers;

an applying apparatus operative to apply thermosetting bonding agent to at least one of said machined bonding end portions; and a heating and press-contacting device operative to press-contact a heating body to at least said tip portion of said scarf-shaped end portion after said one bonding end portion is engaged with the other bonding end portion to evaporate at least part of the moisture in said tip portion.

13. An unseasoned veneer bonding apparatus comprising:

a machining device for machining end portions of unseasoned veneers to be bonded to each other to scarf-shaped bonding end portions;

an applying apparatus for applying thermosetting bonding agent to at least one of said machined bonding end portions;

a heating and press-contacting device for press-contacting a heating body to at least a tip portion of said scarf-shaped end portion after said one bonding end portion is engaged with the other bonding end portion, and further comprising a bonding end portion drying device for press-contacting a heating body at at least one of said machined bonding end portions to evaporate at least part of moisture contained in said bonding end portion.

* * * * *